United States Patent [19]

Mason et al.

[11] Patent Number: 4,552,589

[45] Date of Patent: Nov. 12, 1985

[54] PROCESS FOR THE RECOVERY OF GOLD FROM REFRACTORY ORES BY PRESSURE OXIDATION

[75] Inventors: Peter G. Mason, Scarborough, Canada; Frank D. Wicks, Stansbury Park, Calif.; John C. Gathje, Arvada, Colo.

[73] Assignee: Getty Oil Company, Salt Lake City, Utah

[21] Appl. No.: 574,667

[22] Filed: Jan. 27, 1984

[51] Int. Cl.[4] .............................................. C22B 11/08
[52] U.S. Cl. .................................. 75/105; 75/118 R; 423/29; 423/27
[58] Field of Search ............... 75/105, 118 R; 423/23, 423/27, 29, 30, 31

[56] References Cited

U.S. PATENT DOCUMENTS

| | | | |
|---|---|---|---|
| 2,147,009 | 2/1939 | Chapman | 75/106 X |
| 2,315,187 | 3/1943 | Chapman et al. | 75/106 X |
| 2,869,529 | 1/1959 | Forward et al. | 75/118 R |
| 3,935,006 | 1/1976 | Fischer | 75/118 R |
| 4,038,362 | 7/1977 | Guay | 423/40 |
| 4,053,305 | 11/1977 | Smyres et al. | 75/118 R X |
| 4,188,208 | 2/1980 | Guay | 423/29 X |
| 4,259,107 | 3/1981 | Guay | 423/29 X |
| 4,267,069 | 5/1981 | Davidson et al. | 75/118 R X |
| 4,289,532 | 9/1981 | Matson et al. | 423/29 X |

Primary Examiner—Andrew H. Metz
Assistant Examiner—Nam X. Nguyen
Attorney, Agent, or Firm—Lyon & Lyon

[57] ABSTRACT

A process for recovering precious metals from a refractory ore by forming a slurry which is heated to a temperature in excess of about 150° C. at an oxygen partial pressure in excess of about 10 psia for an effective amount of time to form a partially oxidized slurry which is then subjected to carbon-in-leach treatment to separate the precious metals.

27 Claims, 2 Drawing Figures

PROCESS FOR THE RECOVERY OF GOLD FROM REFRACTORY ORES BY PRESSURE OXIDATION

BACKGROUND OF THE INVENTION

The field of the present invention relates generally to a process for recovering gold or other precious metals from refractory ores by pressure oxidation followed by carbon-in-leach treatment.

Gold and other precious metals naturally occur in ores in several different forms and complexes. Unfortunately, however, the gold-bearing ores found in Nevada, Utah, California and other states in the United States, as well as other countries throughout the world, often contain refractory material which interferes with the extraction of gold and other precious metals. Further, the actual gold content of such ores is variable and an ore with a relatively small actual gold content can have less than one-tenth of an ounce of gold per ton of mined ore. When an ore with a relatively small actual gold content is processed, the adverse effects of refractory material may make the recovery of gold prohibitive unless an effective process is utilized for coping with the refractory material.

In the prior art, many processes are disclosed for treating "sedimentary carbonaceous gold-bearing ores" or refractory ores. However, these processes rarely define the actual constituents posing the problem to the particular process for a particular ore. Thus, as noted by W. J. Guay and M. A. Gross in Preprint 81-34 of the Society of Mining Engineers of AIME, the term "carbonaceous" has been rather loosely applied to ore constituents of widely varying characteristics, including: (1) an activated carbon component capable of adsorbing gold chloride or gold chloride complexes from solutions; (2) a mixture of high molecular weight hydrocarbons usually associated with the activated carbon components; and (3) an organic acid, similar to "humic acid", containing functional groups capable of interacting with gold complexes to form organic gold compounds. While the structure of such compounds is unknown, it is possible that they are formed by chelation wherein ligands, such as N, S or O, in organic acids form stable gold chelates.

In addition to the arbitrary nature of any definition of the term "carbonaceous", the term "refractory" has also been the subject of a rather unsettling, all-inclusive, vague definition. Thus, loosely speaking, the term "refractory" has been used to define an ore containing any substance which interferes with the recovery of gold from said ore by standard cyanidation techniques. One such substance which is commonly known to render an ore refractory is pyrite, which may occlude finely disseminated particles of gold in spheroidal or cubic clusters. Such occluded gold particles may have a size of less than .02 microns. Other materials which may be deemed to render an ore refractory, besides the general class of carbonaceous materials, include clay minerals which can adsorb the gold cyanide complex and certain sulfur bearing compounds other than pyrite.

In the past, extensive research has been conducted into methods for dealing with the problem of carbonaceous impurities in gold-containing ores. Some of these studies have indicated that the carbonaceous material comprises active carbon which appears to adsorb the gold cyanide complex $Au(CN)_2^-$ from cyanide leaching solutions, as well as long chain organic compounds which appear to form stable complexes with the gold.

In an attempt to overcome some of these problems, the United States Bureau of Mines has conducted experiments in which they used a wide variety of oxidation pretreatment systems including ozone, sodium hypochlorite, calcium hypochlorite, permanganates, perchlorates, chlorates and oxygen. As a result of these and other experiments, various processes dealing with pretreatment systems have been patented, including U.S. Pat. No. 1,461,807, which discloses the use of certain mineral oils for "blinding" the action of the carbonaceous impurities on the cyanide complex formation; U.S. Pat. No. 2,234,140, which discloses that certain wetting agents can make the ore more amenable to cyanidation; U.S. Pat. No. 3,639,925, which discloses the use of sodium hypochlorite and calcium hypochlorite as agents for oxidizing the carbonaceous materials so as to prevent them from adsorbing the gold cyanide; U.S. Pat. No. 3,846,124, which discloses a chlorine pretreatment of the ore in the absence of any alkaline material in order to decompose the organic carbonaceous components and remove them prior to cyanidation; U.S. Pat. No. 3,574,600, which discloses that certain acids can be used in conjunction with an ozone treatment prior to cyanidation to oxidize the carbonaceous impurities; and U.S. Pat. No. 4,038,362, which discloses a pre-oxidation technique carried out in the absence of extraneous alkaline material for reducing the amount of chlorine needed to pretreat the ore.

Another process utilizing air oxidation followed by chlorination prior to cyanidation is disclosed by W. J. Guay in the article "How Carlin Treats Gold Ores by Double Oxidation" in *World Mining*, March, 1980, pages 47–49. In this process, an ore bearing gold of which a substantial portion of the ore was not amenable to standard cyanidation techniques because of the presence of activated carbon in pyrite is disbursed in an aqueous slurry of ground ore at 40–50% solids and temperatures of 80°–86° C. until a considerable portion of the pyrite is oxidized to iron oxides. Although some of the carbonaceous materials are decomposed by the oxidation, it was found necessary to follow the air oxidation with chlorination in order to complete the oxidation of the carbonaceous materials and pyrite. This process also utilized the addition of a solution of sodium carbonate over a period of several hours during the air oxygenation to react the air and the soda ash with pyrite to form soluble sulfates and iron oxides. The soda ash is added to the slurry in amounts varying from 25–100 pounds per ton of ore.

In addition to various processes for the pretreatment of carbonaceous ore, other processes have been disclosed which involve modifications to the actual cyanidation process. Thus, U.S. Pat. Nos. 2,147,009 and 2,315,187 disclose the use of finely divided charcoal during cyanidation to simultaneously leach the gold from the ore and absorb the gold on the charcoal so as to maintain the solution continuously depleted of gold and thereby improve cyanidation efficiency. More recently, the prior processes utilizing finely divided charcoal have been improved by replacing the finely divided charcoal with granular activated charcoal. Such a process, which is commonly known in the art as "carbon-in-leach," is disclosed in U.S. Pat. No. 4,289,532, the disclosure of which is hereby specifically incorporated by reference, in which a slurry is initially treated with an oxygen-containing gas for at least an hour and contacted with the source of hypochlorite ions for at least one hour, followed by the simultaneous contact of the oxidized aqueous slurry, in a plurality of stages, with a cyanide complexing agent and granular activated carbon, the carbon flowing in countercurrent fashion with the slurry such that the gold is transferred to the granular activated charcoal. However, this process still consumes large amounts of cyanide, which may be the single most expensive operating cost in an ongoing gold extraction process, and the process is heavily time-consuming because of the retention times involved in the oxidation and chlorination steps.

SUMMARY OF THE INVENTION

In the present invention, refractory gold bearing ores are subjected to a treatment process in which at least part of the substances which cause the ore to be refractory are oxidized at an elevated temperature and oxygen partial pressure to form an oxidized slurry which is then subjected to a carbon-in-leach process. In another aspect of the present invention, the amount of cyanide consumed in the present invention is minimized while water and a portion of the heat required in the present invention are recovered and recycled.

When a refractory gold bearing ore is treated in accordance with the present invention, an ore slurry is formed which is introduced into at least one autoclave maintained at an autoclave temperature in excess of about 150° C. and an autoclave oxygen partial pressure in excess of about 10 psia. The slurry is agitated sufficiently to allow oxygen to oxidize at least part of the substances which cause the ore to be refractory to thereby form an oxidized slurry which is passed to a carbon-in-leach process which utilizes granular activated carbon in a countercurrent flow process. The partial oxidation which occurs in the autoclave increases the recovery of gold from particularly refractory ores in a relatively short time while reducing the consumption of expensive cyanide. Thus, the present invention provides a process by which refractory ores, which may contain both carbonaceous and sulfur-bearing compounds, may be economically treated for the recovery of gold.

When the tailings water stream from the tailings pond of the present process is recycled, the discharge of toxic cyanide is eliminated and problems associated with scarcity of water in some mining locations are at least partially alleviated.

Accordingly, it is a primary object of the present invention to provide an improved process for treating refractory gold bearing ores.

This and further objects and advantages will be apparent to those skilled in the art in connection with the drawings and the detailed description of the preferred embodiment set forth below.

DETAILED DESCRIPTION OF THE PREFERRED EMBODIMENT

Figure 1:
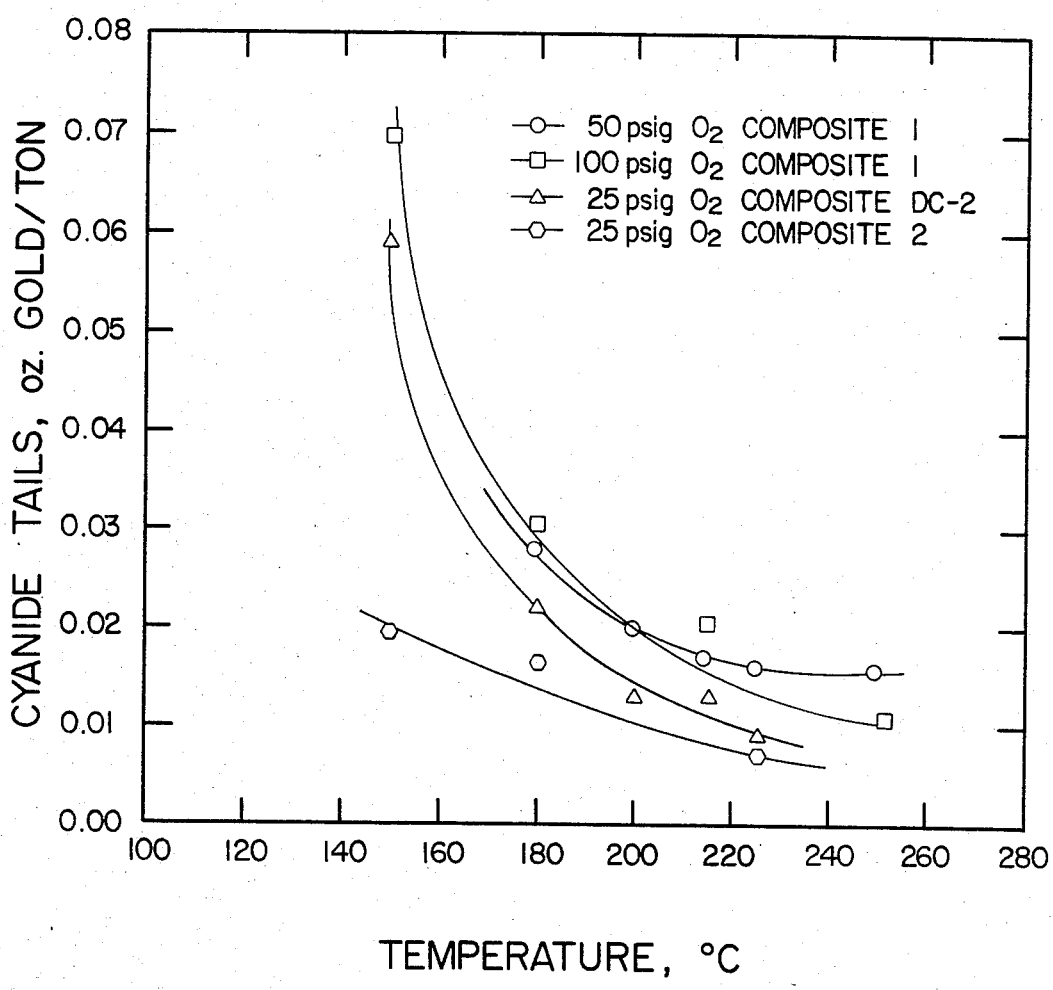
FIG. 1 is a graph of gold present in cyanidation tails versus autoclave temperature for tests conducted according to the present invention.

The present invention is directed to a process for recovering gold from refractory ore. It is contemplated that such an ore may contain one or more of the following substances: carbonaceous compounds, sulfide minerals of iron, arsenic, antimony and other metals. It is anticipated that the gold in ore processed according to the present invention will have an average particle size on the order of 10 microns or less. Further, it is anticipated that the carbonaceous compound content of such an ore will not exceed 5% carbon by weight, and will generally be between about 0.5 to about 1.0% carbon by weight.

In order to provide specific examples of the process of the present invention, the following description of the preferred embodiment will focus, by way of example only, on ore samples taken from the Mercur mine in the Mercur Canyon in the Oquirrh Mountains, Tooele County, about 56 miles by road from Salt Lake City, Utah. The Oquirrh mountain range is predominantly composed of Paleozoic sedimentary rocks which have been folded, faulted and in some places intruded by igneous rocks. The Mercur ore bodies are found in the Mississippian age rocks consisting of thin-bedded carbonaceous limestones. Intrusive rocks in the area consist of irregular masses of porphyritic rhyolite which are barren of gold mineralization. The gold mineralization, which occurs as disseminations of micron sized particles, forms discontinuous stratiform bodies. Deposition of the gold took place in the carbonate host rocks from hydrothermal solutions in a hot springs environment. Minerals associated with the gold are pyrite, marcasite, orpiment, realgar, barite and remobilized carbon. Gold is found in four forms: as native gold, as gold included in pyrite and marcasite, as gold adsorbed onto organic carbon and as gold-hydrocarbon complexes. Decalcification of the lime rocks, formation of the kaolinite and introduction of silica to form jasperoid are the main alteration features of the deposit. A significant portion of the Mercur ore is oxidized and the oxidized zones contain alteration products of the sulfide minerals while being absent of organic matter. Accordingly, the composition for a given sample of gold-bearing ore from this mine, as with any mine, can vary tremendously. Subject to the foregoing limitations, various ore samples were taken of refractory and oxidized ore both above and below 6,850 feet elevation. The samples were combined into composite samples and analyzed. A quantitative analysis of composites 1–6 is given in Table 1 while an X-ray analysis of composites 1–6 is given in Table 2. Another series of composite samples, DC-1 through DC-3, were compiled and a quantitative analysis of these samples is given in Table 3 while an X-ray analysis of these samples is given in Table 4.

In general, for purpose of classification of the Mercur ore, the term "refractory ore" shall be defined as an ore which is less than 60% amenable to gold extraction by standard cyanidation leaching techniques. Thus, said refractory ore will have a percent extraction of gold which is less than sixty by standard cyanide for leaching technique.

TABLE 1

Quantitative Analysis of Composites 1 to 6

| Element | 1 Refractory Above 6,850' | 2 Oxidized Above 6,850' | 3 Composite Above 6,850' | 4 Refractory Below 6,850' | 5 Oxidized Below 6,850' | 6 Composite Below 6,850' |
|---|---|---|---|---|---|---|
| Gold, oz/ton, FA | 0.130 | 0.145 | 0.079 | 0.140 | 0.125 | 0.052 |
| Gold, oz/ton, AA | 0.125[1] | 0.128 | 0.068 | 0.128 | 0.115 | 0.048 |
| Silver, oz/ton, FA | 0.064 | 0.081 | 0.081 | 0.031 | 0.028 | 0.113 |
| Silver, oz/ton, AA | 0.32 | 0.16 | 0.21 | 0.21 | 0.16 | 0.24 |
| Copper, % | 0.013 | 0.006 | 0.004 | 0.005 | 0.017 | 0.003 |
| Lead, % | 0.009 | 0.006 | 0.006 | 0.006 | 0.007 | 0.006 |
| Zinc, % | 0.018 | 0.024 | 0.019 | 0.014 | 0.025 | 0.017 |
| Iron, % | 2.32 | 2.29 | 2.33 | 2.44 | 2.04 | 1.55 |
| Total carbon, % | 4.78 | 4.59 | 4.99 | 3.34 | 4.01 | 4.86 |
| $CO_3^=$, % | 23.8 | 22.0 | 23.2 | 14.5 | 19.5 | 23.3 |
| Organic carbon, % | 0.42 | 0.19 | 0.35 | 0.44 | 0.11 | 0.20 |
| Total sulfur, % | 2.60 | 1.65 | 1.75 | 3.09 | 0.90 | 0.95 |
| $SO_4^=$, % | 3.07 | 2.66 | 2.00 | 4.15 | 1.23 | 1.15 |
| Sulfide sulfur, % | 1.16 | 0.61 | 0.88 | 1.02 | 0.31 | 0.37 |
| Mercury, ppm | 28 | 28 | 15 | 49 | 18 | 14 |
| Thallium, ppm | 249 | 147 | 131 | 175 | 125 | 73 |
| Arsenic, % | 0.25 | 0.20 | 0.13 | 0.05 | 0.08 | 0.04 |
| Antimony, % | 0.031 | 0.035 | 0.041 | 0.030 | 0.033 | 0.039 |
| Magnesium, % | 0.30 | 0.44 | 0.54 | 0.26 | 0.33 | 0.39 |
| Calcium, % | 14.9 | 16.8 | 15.8 | 10.1 | 12.4 | 15.5 |
| Barium, % | 0.38 | 0.26 | 0.11 | 1.05 | 0.81 | 0.78 |
| Chloride, ppm | 470 | 190 | 280 | 260 | 180 | 50 |
| Aluminum, % | 3.41 | 3.39 | 3.77 | 4.16 | 3.36 | 2.64 |
| Silica, % $SiO_2$ | 40.7 | 40.6 | 38.1 | 47.3 | 47.3 | 42.7 |
| Nickel, % | 0.006 | 0.006 | 0.006 | 0.006 | 0.005 | 0.005 |
| Cadmium, % | 0.001 | 0.001 | 0.001 | 0.001 | 0.001 | 0.001 |
| Potassium, % | 0.67 | 0.68 | 0.69 | 0.95 | 0.83 | 0.68 |
| Sodium, % | 0.50 | 0.035 | 0.11 | 0.11 | 0.042 | 0.030 |
| Phosphate, % $PO_4$ | 0.27 | 0.24 | 0.11 | 0.12 | 0.21 | 0.16 |
| Selenium, ppm | 1.0 | 0.8 | 1.1 | 1.5 | 0.7 | 0.7 |
| Fluorine, % | 0.17 | 0.16 | 0.14 | 0.13 | 0.12 | 0.12 |
| Specific Gravity | 2.67 | 2.67 | 2.73 | 2.71 | 2.68 | 2.71 |

FA = fire assay
AA = atomic absorption
[1] Neutron activation gold analysis of Composite 1 gave the following results: Gold = 4.203 ± 0.038 ppm; equivalent to 0.123 oz gold/ton.

TABLE 2

X-Ray Analysis of Composites 1 to 6

| Element, % | 1 | 2 | 3 | 4 | 5 | 6 |
|---|---|---|---|---|---|---|
| Copper | 0.018 | 0.010 | 0.010 | 0.018 | 0.013 | 0.020 |
| Silver | | | | | | 0.004 |
| Zinc | 0.011 | 0.023 | 0.022 | 0.007 | 0.023 | 0.015 |
| Lead | 0.012 | 0.026 | 0.019 | 0.016 | 0.026 | 0.03 |
| Arsenic | 0.34 | 0.28 | 0.19 | 0.045 | 0.071 | 0.036 |
| Antimony | | | 0.009 | | | 0.015 |
| Iodine | | | 0.007 | | | 0.016 |
| Iron | 1.4 | 1.4 | 1.3 | 1.5 | 1.3 | 1.2 |
| Nickel | 0.006 | 0.008 | 0.004 | 0.004 | 0.008 | 0.002 |
| Rubidium | 0.011 | 0.015 | 0.014 | 0.016 | 0.010 | 0.003 |
| Barium | 0.62 | 0.48 | 0.24 | 2.2 | 1.5 | 1.7 |
| Strontium | 0.077 | 0.084 | 0.076 | 0.078 | 0.074 | 0.090 |
| Titanium | 0.051 | 0.034 | 0.034 | | | |
| Molybdenum | | | 0.002 | 0.003 | | |
| Manganese | 0.022 | 0.026 | 0.024 | 0.019 | 0.025 | 0.014 |
| Yttrium | 0.002 | | | | | |
| Zirconium | | 0.008 | | | | |

The above numbers represent a semi-qualitative and semi-quantitative analysis. No check was made for elements with atomic number less than 22. Elements not listed or for which no value is given were not detected.

TABLE 3

Quantitative Analysis of Composites DC-1 to DC-3

| Element | DC-1 | DC-2 | DC-3 |
|---|---|---|---|
| Gold, oz/ton, FA | 0.088 | 0.110 | 0.116 |
| Gold, oz/ton, AA | 0.083 | 0.113 | 0.108 |
| Silver, oz/ton, FA | <0.01 | <0.01 | <0.01 |
| Silver, oz/ton, AA | 0.11 | 0.14 | 0.08 |
| Copper, % | 0.004 | 0.004 | 0.002 |
| Lead, % | 0.007 | 0.007 | 0.007 |
| Zinc, % | 0.008 | 0.020 | 0.006 |
| Iron, % | 2.65 | 2.69 | 1.95 |
| Total carbon, % | 4.15 | 3.26 | 4.21 |
| $CO_3^=$, % | 18.8 | 25.9 | 14.6 |
| Organic carbon, % | 0.47 | 0.42 | 0.12 |
| Total sulfur, % | 2.28 | 1.90 | 0.39 |
| $SO_4^=$, % | 1.66 | 1.83 | 1.04 |
| Sulfide sulfur, % | 1.86 | 1.35 | 0.18 |
| Mercury, ppm | 29.6 | 25.2 | 33.0 |
| Thallium, ppm | 155 | 285 | 695 |
| Arsenic, % | 0.09 | 0.11 | 0.13 |
| Antimony, % | 0.07 | <0.01 | 0.04 |
| Magnesium, % | 0.31 | 0.37 | 0.30 |
| Calcium, % | 12.5 | 16.7 | 12.8 |
| Barium, % | 0.34 | 0.71 | 0.60 |
| Chloride, ppm | 270 | 300 | 170 |
| Aluminum, % | 4.58 | 3.20 | 3.70 |
| Silica, % $SiO_2$ | 44.7 | 38.5 | 47.4 |
| Nickel, % | 0.008 | 0.009 | 0.007 |
| Cadmium, % | 0.001 | <0.001 | <0.001 |
| Potassium, % | 1.25 | 0.88 | 1.16 |
| Sodium, % | 0.34 | 0.30 | 0.009 |
| Phosphate, %, $PO_4$ | 0.27 | 0.23 | 0.22 |
| Selenium, ppm | 1.7 | 1.0 | 2.6 |

TABLE 3-continued

Quantitative Analysis of Composites DC-1 to DC-3

| Element | Composite DC-1 | DC-2 | DC-3 |
|---|---|---|---|
| Fluorine, % | 0.12 | 0.11 | 0.12 |

FA = fire assay.
AA = atomic absorption

TABLE 4

X-ray Analysis of DC Composites

| Element, % | Composite DC-1 | DC-2 | DC-3 |
|---|---|---|---|
| Copper | 0.004 | 0.021 | 0.025 |
| Zinc | 0.008 | 0.016 | 0.014 |
| Thallium | 0.017 | 0.042 | 0.11 |
| Lead | 0.008 | 0.009 | 0.010 |
| Arsenic | 0.13 | 0.24 | 0.16 |
| Iron | 2.2 | 2.1 | 2.0 |
| Nickel | 0.013 | 0.010 | 0.019 |
| Rubidium | | 0.016 | 0.014 |
| Barium | 0.56 | 1.3 | 1.2 |
| Strontium | 0.062 | 0.10 | 0.093 |
| Titanium | 0.10 | 0.089 | 0.087 |
| Zirconium | 0.037 | 0.064 | 0.055 |
| Manganese | 0.041 | 0.058 | 0.029 |
| Yttrium | 0.008 | 0.011 | 0.009 |
| Selenium | | | |

The above numbers represent a semi-qualitative and semi-quantitative analysis. No check was made for elements with atomic numbers less than 22. Elements not listed or for which no values are given were not detected.

Composites 1-6 and DC-1 through DC-3 were subjected to standard cyanidation and direct carbon-in-leach treatment, and most of the samples were also subjected to the process of the present invention to compare the improvement in extraction of gold from the samples of varying compositions. The wide range in the refractory nature of the samples is demonstrated by the variable response to leaching by standard cyanidation techniques. A significant improvement in extraction from the more refractory material was achieved by the process of the present invention as is shown by the results set forth in Table 5.

TABLE 5

| | Head Grade (oz Au/t) | Percent Extraction of Gold | | |
|---|---|---|---|---|
| | | Standard Cyanidation | Direct Carbon-in-Leach (CIL) | Pressure Oxidation/ CIL |
| Samples | | | | |
| 1 | 0.125 | 53 | 65 | 88 |
| 2 | 0.128 | 78 | 82 | 95 |
| 3 | 0.068 | 27 | 69 | — |
| 4 | 0.128 | 22 | 78 | 90 |
| 5 | 0.115 | 88 | 88 | — |
| 6 | 0.048 | 57 | 81 | — |
| DC composites | | | | |
| 1 | 0.083 | 38 | 70 | 88 |
| 2 | 0.113 | 46 | 65 | 89 |
| 3 | 0.108 | 91 | 87 | 92 |

In general, the process of the present invention begins with the initial removal of the ore from the ground. Thereafter, the mined ore is crushed and blended by stockpiling in layers, the objective being to reduce fluctuations in the constituents which cause the ore to be refractory. These fluctuations may otherwise affect process efficiency. The crushed ore is ground in a semi-autogenous (SAG)/ball mill circuit with cyclone classification. The thickened product is treated under oxygen pressure at elevated temperature to render the refractory ore amenable to cyanidation. Gold is absorbed from the leach pulp using the carbon-in-leach technique. The gold is then stripped under pressure, and recovered by electrolysis.

In the first step of the process of the present invention, the ore is converted into a slurry. To form a slurry from the ore initially mined, the ore is crushed and blended. Thereafter, one or more stages of grinding reduce the size of the ore and the ground ore is thickened with the aid of a flocculant. The clear supernatant is then recycled to the grinding circuit. Tailings liquor is treated for removal of cyanides and recycled for use within the grinding circuit, as will be discussed more fully hereinafter, with additional fresh water make-up being used as needed.

In the second step of the process of the present invention, the ore slurry is rendered more amenable to cyanidation by treatment through a mechanically agitated autoclave or a plurality of mechanically agitated autoclaves. For the purpose of example only, it will be assumed hereafter that a plurality of autoclaves in series is being used. The autoclave vessels are held under oxygen pressure at an elevated temperature. Final heating to operating temperature is accomplished by injection of live steam and oxygen which may be introduced into each autoclave. Gases should flow countercurrent to the pulp, with a bleed being drawn from the first stage to remove inert reaction products.

In the pressure oxidation step of the present invention, oxygen consumption is dependent upon the refractory nature of the ore. In the present example, it is assumed that a range from about 0.30 to about 1.85% sulfide sulfur, with an average level of 1.07%, is present in the gold-bearing ore. Carbon dioxide is generated in the process following the oxidation of the sulfides as follows:

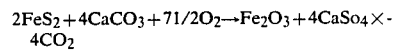

$$2FeS_2 + 4CaCO_3 + 71/2 O_2 \rightarrow Fe_2O_3 + 4CaSO_4 \times - 4CO_2$$

The liberation of carbon dioxide will begin during pulp heat-up, between about 150° C. and 175° C., and may be expected to continue during pulp cooling. However, when the ore also contains carbonates, the sulfate ions produced during the autoclave oxidation of the sulfide react with the carbonates to produce calcium sulfate, commonly known as gypsum, which may deposit on the inside of the autoclave to form a relatively insoluble scale to cause operational problems. One way to control such formation is to add a basic compound which will provide ions, such as sodium, which will combine with the sulfate ions and which will not form an insoluble species. When sodium carbonate was added to the autoclave, the gold analysis of the final cyanidation tails went down for most composites in most tests. Less extensive testing for sodium bicarbonate and sodium hydroxide tended to indicate a similar beneficial effect.

The autoclave temperature is a critical parameter in the pressure oxidation step where high temperatures can lead to prohibitively expensive operational costs while low temperatures will be inadequate to effectuate improved gold recovery. By way of example only, a summary of tests evaluating the effect of autoclave temperature is given in Table 6 and shown graphically in FIG. 1. The data show a decrease in the final cyanidation tails gold assay with increased autoclave temperature. A minimum in the tails assay was achieved at approximately 220°–250° C. This minimum was essentially independent of the initial oxygen pressure. For composite 1, the data show that the difference in the tails for 50 or 100 psig oxygen pressure is not significant. Accordingly, the dependence of the pressure oxidation stage on the partial pressure of oxygen appears to be minimal, provided a partial pressure of oxygen of about 10–25 psia is exceeded and adequate mixing is obtained.

TABLE 6
Effect of Autoclave Temperature

| Temp °C. | $O_2$ Pressure psig | Cyanide Tails Assay oz gold/ton |
|---|---|---|
| Composite 1: | | |
| 180 | 50 | 0.028 |
| 200 | ↓ | 0.020 |
| 215 | ↓ | 0.017 |
| 225 | ↓ | 0.016 |
| 249 | ↓ | 0.021 |
| 250 | ↓ | 0.016 |
| 150 | 100 | 0.070 |
| 180 | ↓ | 0.031 |
| 180 | ↓ | 0.027 |
| 215 | ↓ | 0.021 |
| 225 | ↓ | 0.011 |
| Composite 2: | | |
| 150 | 25 | 0.020 |
| 180 | ↓ | 0.017 |
| 225 | ↓ | 0.007 |
| Composite DC-2: | | |
| 150 | ↓ | 0.060 |
| 180 | ↓ | 0.023 |
| 200 | ↓ | 0.014 |
| 215 | ↓ | 0.014 |
| 225 | ↓ | 0.010 |

All tests at 60 minutes and 40% solids.

In order to achieve adequate mixing without unnecessarily diluting the slurry, it has been found preferable to maintain the solids content of the slurry between about 40% to about 50% and it is postulated that the rate of reaction in the pressure oxidation stage is controlled by the mass transport of oxygen to the solids' surface. However, the selection of the proper type of mixing equipment and the mixing speed utilized within the autoclaves is deemed to be well within the scope of one of ordinary skill in the art.

Figure 2:
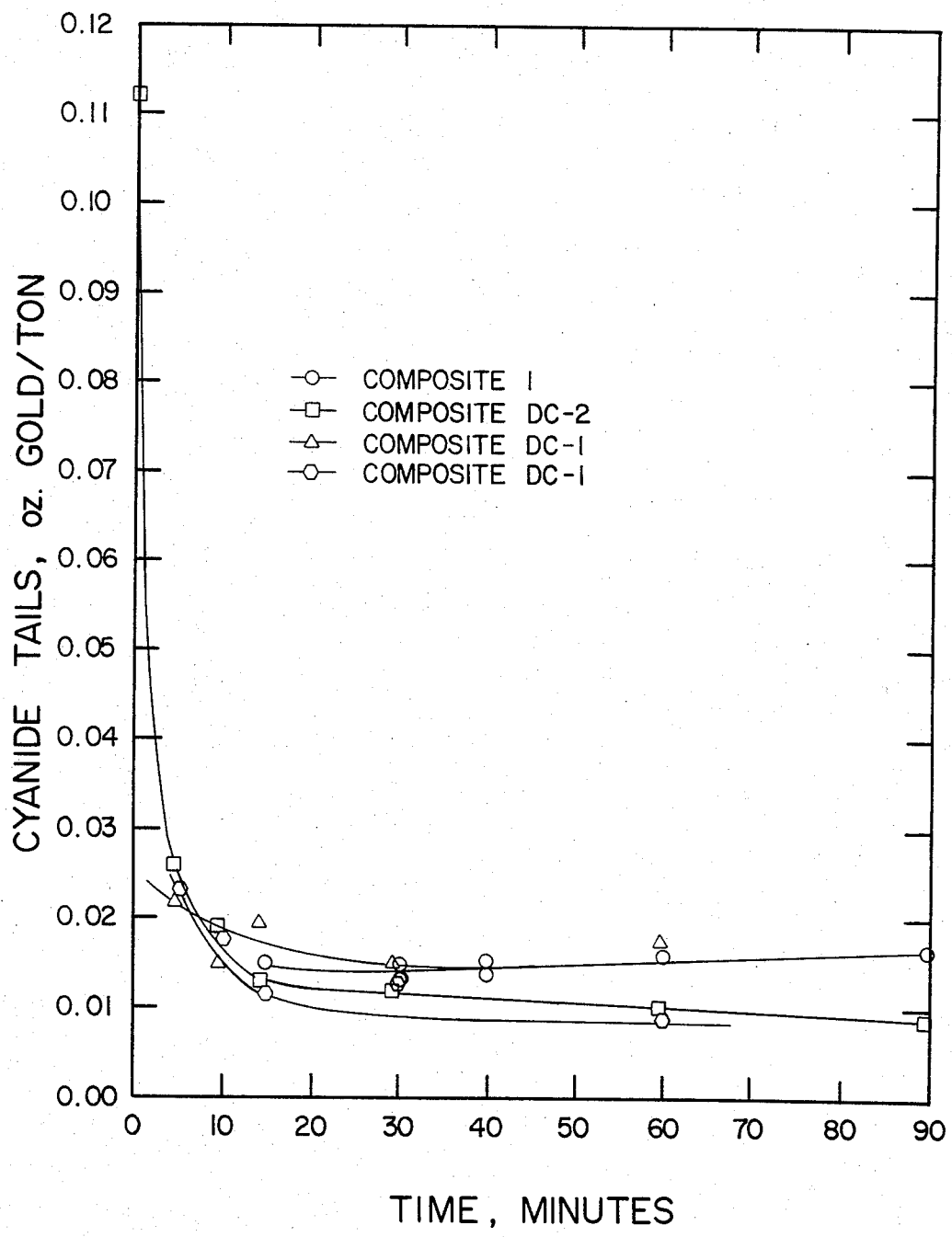
FIG. 2 is a graph of gold present in cyanidation tails versus time in the pressure oxidation step for tests conducted according to the present invention.

Another critical variable in the pressure oxidation step is the residence time which the ore slurry spends in the autoclaves. By way of example only, a summary of tests evaluating the effect of autoclave time is given in Table 7 and shown graphically in FIG. 2. The data show a curve with minimum slope from approximately 30–90 minutes. Progressively higher tails assays result from shorter times. Complete oxidation of the sulfides is unnecessary; within an average 30-minute treatment period found to be adequate, less than 50% of the sulfides may be oxidized. To maintain the oxygen pressure, a bleed is required from the autoclaves as carbon dioxide is evolved from the reaction of carbonates noted above. Additionally, since the amount of oxygen consumed will inevitably vary depending upon the refractory nature of the ore being treated, the oxygen partial pressure must be monitored to assure it does not drop below a minimum of about 10–25 psia. The partial pressure of oxygen may be maintained by the introduction of either pure oxygen, air or a mixture of both into the autoclaves to ensure that an effective amount of the substances which cause the ore to be refractory will be oxidized in the pressure oxidation step.

TABLE 7
Effect of Autoclave Time

| $O_2$ Pressure psig | Time min | Cyanide Tails Assay oz gold/ton |
|---|---|---|
| Composite 1: | | |
| 50 | 30 | 0.013 |
| 50 | 40 | 0.015 |
| 50 | 40 | 0.014 |
| 50 | 60 | 0.016 |
| 50 | 30 | 0.015 |
| 50 | 90 | 0.017 |
| 25 | 15 | 0.015 |
| Composite DC-2: | | |
| 25 | 0 | 0.112 |
| ↓ | 5 | 0.026 |
| ↓ | 10 | 0.019 |
| ↓ | 15 | 0.013 |
| ↓ | 30 | 0.012 |
| ↓ | 60 | 0.010 |
| ↓ | 90 | 0.009 |
| Composite DC-1: | | |
| ↓ | 5 | 0.022 |
| ↓ | 10 | 0.015 |
| ↓ | 15 | 0.020 |
| ↓ | 30 | 0.015 |
| ↓ | 60 | 0.018 |
| ↓ | 90 | 0.017 |
| ↓ | 5 | 0.023 |
| ↓ | 10 | 0.018 |
| ↓ | 15 | 0.012 |
| ↓ | 30 | 0.013 |
| ↓ | 60 | 0.010 |

All tests at 225° C. and 40% solids.

In the third stage of the process of the present invention, pulp from the pressure oxidation step is passed through a surge tank to which a basic chemical may be added for pH adjustment. It has been found that the pulp from the pressure oxidation step should preferably be cooled to a temperature below about 50° C. before it is introduced to carbon-in-leach treatment. This cooling may take place in a heat exchanger which recovers part of the heat to be used upstream from the heat exchanger. In addition to cooling the pulp, it may be necessary to dilute the pulp before the carbon-in-leach treatment wherein cyanide may be added to the first of a plurality of mechanically agitated vessels in series in which gold extraction from ore by cyanidation and carbon absorption will proceed simultaneously. Pulp is transferred continuously downstream through interstage screens from a first vessel to the following vessel in the series of vessels while activated granular charcoal carbon is advanced from the last vessel toward the first vessel. Fresh reactivated granular charcoal carbon is added to the last stage and the loaded charcoal is withdrawn from the first stage. Pulp leaving the last stage is passed through an additional screen to scavenge some attrited carbon before being discarded to a tailings pond from which the tailings water may be recycled to the slurry formation step.

When liquid from the tailings pond is recycled upstream of the autoclaves, it has been found that free cyanide in the recycled liquid unexpectedly decreases the efficiency of the gold recovery of the present invention. This is in contrast to conventional cyanidation techniques in which the excess free cyanide would in fact be utilized to help oxidize the slurry to be treated. To overcome this unexpected problem, the free cyanide must be removed by any suitable means.

The invention will be further illustrated in the following example in which the pressure oxidation step is described in greater detail. Thus, the operating conditions in the autoclaves are as follows: a temperature of about 225° C., a retention time of about 30 minutes, an oxygen overpressure of about 25 psia, an agitation of about 100 hp/5,000 gallon unit, a pulp density of about 45% solids, a grind of about 80% passing through 325 mesh, a reagent addition of about 8 pounds NaOH/ton ore, an oxygen supply (average) of about 45 lb/ton ore and a steam supply (maximum) of about 250 lb/ton of ore. At least six stages are utilized to avoid by-passing inefficiency. This might be achieved through six vertical units or one or two multistage horizontal autoclaves. The gas bleed and oxygen input are controlled by manifolding the bleed gas from each stage and exhausting to control pressure, while injecting oxygen to maintain a desired oxygen concentration in the atmosphere of each vessel. The agitation is designed to reentrain gas at the pulp surface. A flash heat exchange system is used to recover heat, followed by steam injection to attain the desired pulp temperature in the first stage. Bleed gas is contacted with feed pulp to recover some heat as well as to provide initial scrubbing. Although the pulp would be alkaline, pitting corrosion could occur above the pulp interface. Accordingly, a mild steel autoclave would require at least a partial protective lining.

Having fully described the present invention, it will be apparent from the above description and drawings that various modifications in the process of the present invention may be made within the scope of this invention. Therefore, this invention is not intended to be limited except as may be required by the lawful scope of the following claims.

What is claimed is:

1. A process for recovering gold from a refractory ore slurry, said process comprising the steps of:
    introducing the slurry to at least one agitated autoclave maintained at an autoclave temperature in excess of about 150° C. and an autoclave oxygen partial pressure in excess of about 10 psia;
    agitating the slurry to allow oxygen to oxidize at least part of the substances which cause the ore to be refractory to form an oxidized slurry;
    passing the oxidized slurry to a plurality of stages in which the oxidized slurry is contacted with a cyanide and activated charcoal, the charcoal flowing in countercurrent fashion with said oxidized slurry whereby precious metals are transferred to the activated charcoal; and
    separating the activated charcoal from the oxidized slurry.

2. The process as recited in claim 1 wherein the autoclave temperature is maintained between about 180° C. to about 225° C.

3. The process is recited in claims 1 or 2 wherein the autoclave oxygen partial pressure is maintained at a minimum between about 10 psia and about 25 psia.

4. A process as recited in claim 1 wherein a basic compound, is added to the ore slurry to form an insoluble species with free sulfate ions.

5. A process as recited in claim 4 wherein the basic compound comprises sodium carbonate.

6. A process as recited in claim 1, comprising the further step of:
    cooling the oxidized slurry before the oxidized slurry is contacted with the cyanide.

7. A process as recited in claim 1, comprising the further step of:
    raising the pH of the oxidized slurry before the oxidized slurry is contacted with the cyanide.

8. A process as recited in claim 1, comprising the further step of:
    diluting the oxidized slurry before the oxidized slurry is contacted with the cyanide.

9. A process as recited in claim 1 wherein the ore slurry is maintained within the autoclave step from approximately 30-90 minutes.

10. A process for recovering gold, said process comprising the steps of:
    forming an ore slurry from a refractory gold bearing ore;
    introducing the slurry to to at least one autoclave which is maintained at an autoclave temperature in excess of about 150° C. and an autoclave oxygen partial pressure maintained in excess of about 10 psia;
    agitating the slurry sufficiently to oxidize at least part of the substances which cause the ore to be refractory to form an oxidized slurry;
    passing the oxidized slurry to a plurality of stages in which the oxidized slurry is contacted with a cyanide and activated charcoal at a cyanidation temperature less than about 50° C., said charcoal flowing in countercurrent fashion with said oxidized slurry whereby gold is transferred to the activated charcoal; and
    separating the activated charcoal from the oxidized slurry.

11. The process as recited in claim 10 wherein the autoclave temperature is maintained between about 180° C. to about 225° C.

12. The process as recited in claims 10 or 11 wherein the autoclave oxygen partial pressure is maintained at about 15 psia.

13. A process as recited in claim 10 wherein a basic compound is added to the ore slurry to form an insoluble species with free sulfate ions.

14. A process as recited in claim 13 wherein the basic compound is selected from the group consisting of sodium carbonate, sodium bicarbonate and sodium hydroxide.

15. A process as recited in claim 10 wherein the gold in the ore exists in a finely disseminated form with an average size of less than 10 microns.

16. A process as recited in claim 10 wherein the refractory ore contains a sulfur bearing compound which is at least partially oxidized in at least one autoclave.

17. A process as recited in claim 10 wherein the ore is less than 60% amenable to standard cyanidation techniques.

18. A process as recited in claim 17 wherein more than 85% of the gold existing in the ore slurry is transferred to the activated charcoal.

19. A process as recited in claim 10 wherein the ore slurry is maintained within at least autoclave for from about ten minutes to about thirty minutes.

20. A process as recited in claim 10 wherein the activated charcoal is separated from the oxidized slurry from about 4 hours to about 8 hours after said activated charcoal is contacted with the oxidized slurry.

21. A process for recovering gold, said process comprising the steps of:
    forming an ore slurry by grinding a refractory gold bearing ore to form a slurry which is mixed with a diluent stream;

introducing the slurry to at least one autoclave which is maintained at an autoclave temperature in excess of about 150° C. and an autoclave oxygen partial pressure maintained in excess of about 10 psia;

agitating the slurry to oxidize substances which cause the ore to be refractory to form an oxidized slurry;

cooling the oxidized slurry to a temperature less than about 150° C.;

passing the oxidized slurry to a plurality of stages in which the oxidized slurry is contacted with a cyanide and activated charcoal, the activated charcoal flowing in countercurrent fashion with the oxidized slurry whereby gold is transferred to the activated charcoal;

separating the activated charcoal from the oxidized slurry;

collecting a tailings stream from the oxidized slurry;

treating a water portion of the tailings stream to destroy any free cyanide and form a treated reclaimed water stream; and recycling the treated reclaimed water stream to a step of the process upstream from the step of passing the oxidized slurry to a plurality of stages.

22. A process as recited in claim 21 wherein the treated reclaimed water stream is combined with a feed stream to form the diluent stream.

23. A process as recited in claim 21 wherein the oxidized slurry is cooled by a heat exchanger which is utilized to preheat the slurry.

24. A process as recited in claim 21, comprising the further step of:

diluting the oxidized slurry to dethicken said oxidized slurry before the oxidized slurry is contacted with the cyanide.

25. A process as recited in claim 24 wherein the reclaimed water stream is used to dilute the oxidized slurry.

26. A process as recited in claim 21 wherein the ore slurry is maintained within at least one autoclave from about 10 minutes to less than about 60 minutes and the carbon-in-leach residence time is from about 4 hours to about 8 hours.

27. A process as recited in claim 26 wherein the ore slurry is less than 60% amenable to standard cyanidation techniques and more than 85% of the gold in said ore slurry is transferred to the activated charcoal.

* * * * *